(12) United States Patent
Melino, Sr. et al.

(10) Patent No.: US 8,376,646 B2
(45) Date of Patent: Feb. 19, 2013

(54) ADJUSTABLE POLE

(75) Inventors: Charles Melino, Sr., Providence, RI (US); Charles Melino, Jr., Cranston, RI (US)

(73) Assignee: ToolLab, Inc., West Warwick, RI (US)

( * ) Notice: Subject to any disclaimer, the term of this patent is extended or adjusted under 35 U.S.C. 154(b) by 0 days.

(21) Appl. No.: 13/071,373

(22) Filed: Mar. 24, 2011

(65) Prior Publication Data

US 2011/0236123 A1    Sep. 29, 2011

Related U.S. Application Data

(60) Provisional application No. 61/317,246, filed on Mar. 24, 2010.

(51) Int. Cl.
*F16B 7/10* (2006.01)
(52) U.S. Cl. .................... 403/109.3; 403/322.4
(58) Field of Classification Search .... 403/109.1–109.3, 403/109.6–109.8, 322.4, 377; 135/75; 248/354.5, 248/354.6, 407–409, 411, 414
See application file for complete search history.

(56) References Cited

U.S. PATENT DOCUMENTS

| | | | | |
|---|---|---|---|---|
| 1,320,613 | A * | 11/1919 | Gilcrease | 248/352 |
| 1,726,372 | A * | 8/1929 | Stoll | 248/601 |
| 2,473,632 | A * | 6/1949 | Bode | 248/408 |
| 3,780,974 | A * | 12/1973 | Takahashi | 248/411 |
| 5,813,647 | A * | 9/1998 | Chen | 248/354.7 |
| 7,097,380 | B2 * | 8/2006 | Lee | 403/109.2 |
| 7,581,288 | B2 * | 9/2009 | Zhang | 15/414 |
| 7,874,303 | B2 * | 1/2011 | Xie | 135/120.3 |
| 2004/0101351 | A1 * | 5/2004 | Pitcher | 403/109.5 |
| 2005/0158118 | A1 * | 7/2005 | Hsieh | 403/379.2 |
| 2009/0206226 | A1 * | 8/2009 | Forrest et al. | 248/354.6 |

* cited by examiner

*Primary Examiner* — Joshua Kennedy
(74) *Attorney, Agent, or Firm* — Steven N. Fox, Esq.

(57) ABSTRACT

An adjustable pole comprising an upper pole telescopically engaged with a lower pole. The adjustable pole further comprises a locking unit secured to an upper end of the lower pole. The locking unit comprises a housing having a lower bore engaged with the upper end of the lower pole. The housing further comprises an upper bore disposed above the lower bore for freely receiving the upper pole into and out of the lower pole. The housing further comprises a channel disposed adjacent the upper bore. The locking unit further comprises a lever rotatably supported within the channel between a locked position where the upper pole cannot move relative to the lower pole and an unlocked position where the upper pole may be moved. The lever comprises a tooth catch engaged with the upper pole and substantially shielded by the channel between the locked and unlocked positions.

20 Claims, 11 Drawing Sheets

ADJUSTABLE POLE

CROSS-REFERENCE TO RELATED APPLICATIONS

This application claims priority to U.S. Provisional Application Ser. No. 61/317,246 filed on Mar. 24, 2010, which is hereby incorporated by reference in its entirety into this specification.

BACKGROUND OF THE INVENTION

Figure 1:
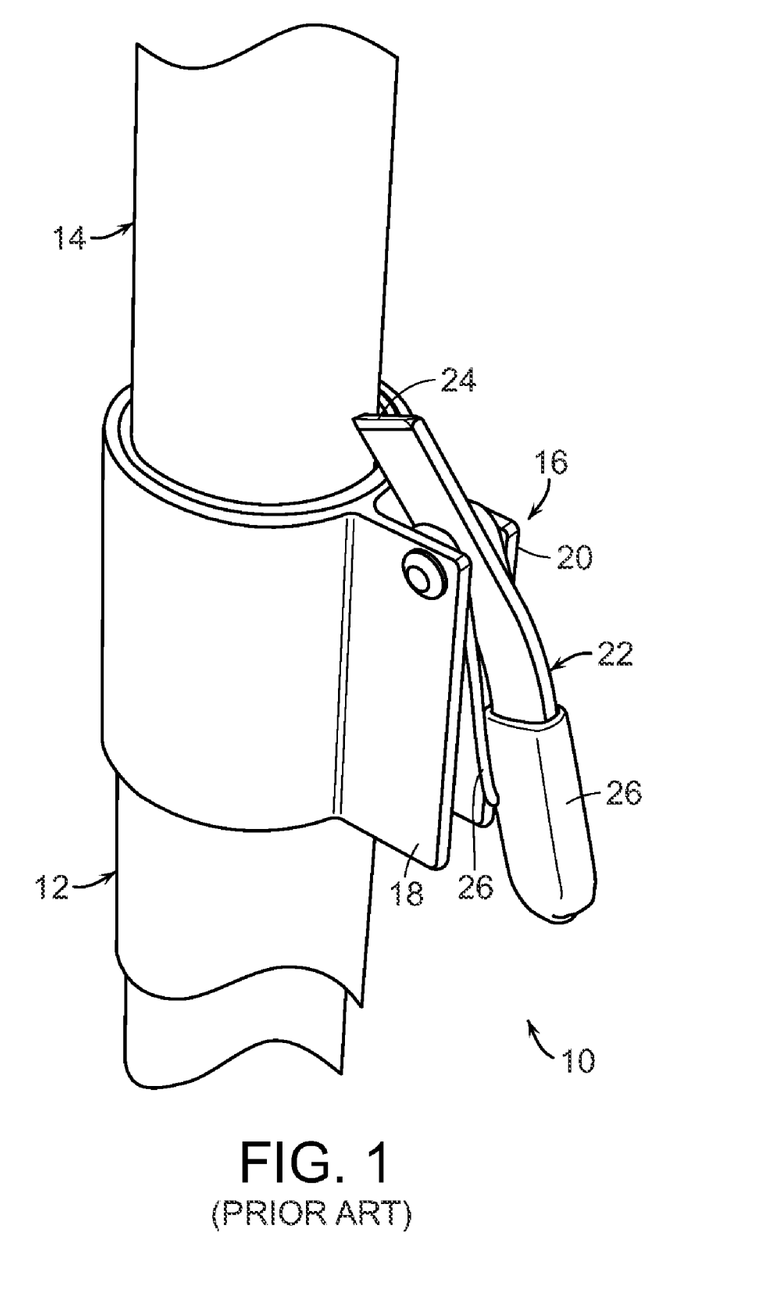
FIG. 1 is a perspective view of a prior art adjustable pole.

Referring to FIG. 1, a conventional adjustable pole assembly 10 is shown having an upper pole 14 telescopically mounted within a lower pole 12. A locking unit 16 is secured to the upper end of lower pole 12. Locking unit 16 has outward extending left and right flanges 18 and 20. A lever 22 having a sharp edge 24 and a handle 26 is rotatably mounted within left and right flanges 18 and 20 and by a spring 28 between a normally biased locked position where sharp edge 24 securely engages upper pole 14 and an unlocked position upon depression of handle 26 where upper pole 14 can be adjusted. Conventional devices of this type suffer from various drawbacks. By way of example only, such conventional devices have a fully exposed sharp edge 24 that may inadvertently pinch and/or otherwise make contact with a person's finger or clothing during the unlocking and locking process thereby causing damage and/or injury. By way of further example, such conventional devices do not allow locking unit 16 to be quickly replaced at the work site. Still further, the rubber sleeve thumb grip 26 employed by such conventional devices becomes damaged by continuous contact and movement with spring 28.

SUMMARY OF THE INVENTION

One object of the present invention is to provide an adjustable pole having a locking unit that is safer to use than conventional devices.

Another object of the present invention is to provide an adjustable pole having a locking unit that can be easily replaced at the work site.

Another object of the present invention is to provide an adjustable pole having a locking unit that is more durable and has a longer life than conventional devices.

The present invention is an adjustable pole comprising an upper pole telescopically engaged with a lower pole. The adjustable pole further comprises a locking unit secured to an upper end of the lower pole. The locking unit comprises a one-piece unitary housing having a lower bore engaged with the upper end of the lower pole. The housing further comprises an upper or guide bore disposed above the lower bore for freely receiving and guiding the upper pole into and out of the lower pole. The upper and lower bores have a common central axis. The housing further comprises a channel disposed adjacent the upper bore. The channel comprises a floor, left and right sidewalls, and a top wall. The channel further comprises a slot having a first portion formed in the floor and a second portion formed in the top wall to provide access between the channel and the upper pole. The locking unit further comprises a lever rotatably supported within the channel between a locked position where the upper pole cannot move relative to the lower pole and an unlocked position where the upper pole may be moved. The lever comprises a handle portion disposed outward of the channel and a tooth catch engaged with the upper pole. The tooth catch is substantially shielded by the left and right sidewalls and top wall of the channel between the locked and unlocked positions.

BRIEF DESCRIPTION OF THE DRAWINGS

The following description of the invention will be more fully understood with reference to the accompanying drawings in which.

DESCRIPTION OF THE INVENTION

Figure 2:
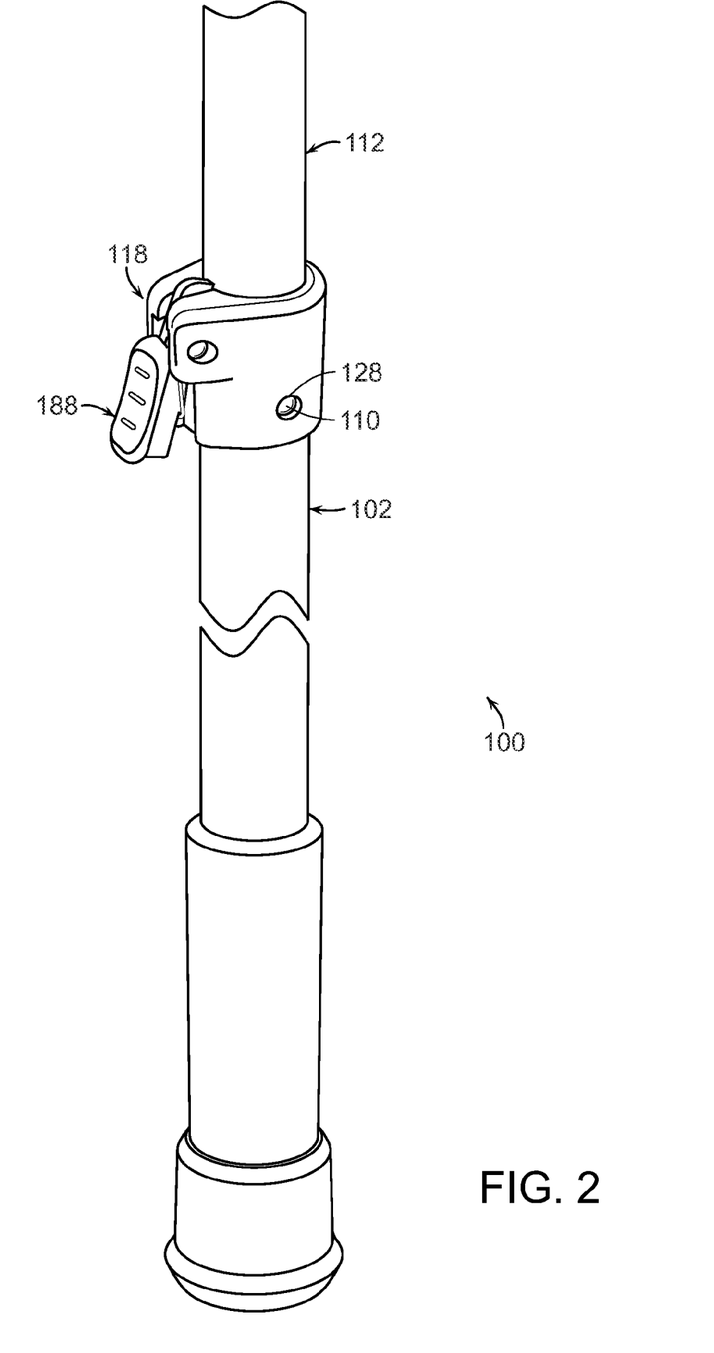
FIG. 2 is a perspective view of an adjustable pole according to the present invention shown in a locked position.
Figure 3:
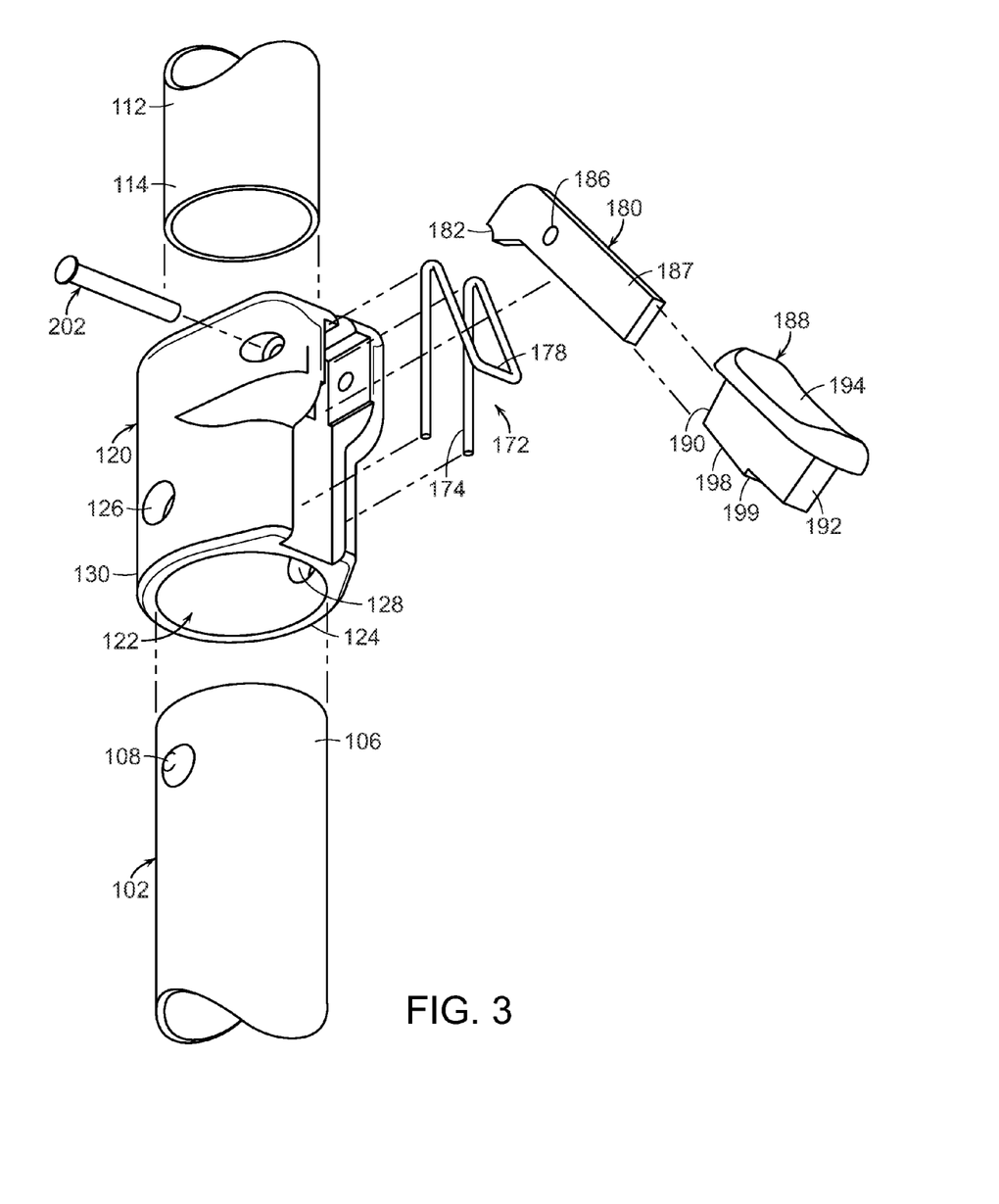
FIG. 3 is an exploded perspective view of the adjustable pole showing a locking unit according to the present invention.
Figure 4:
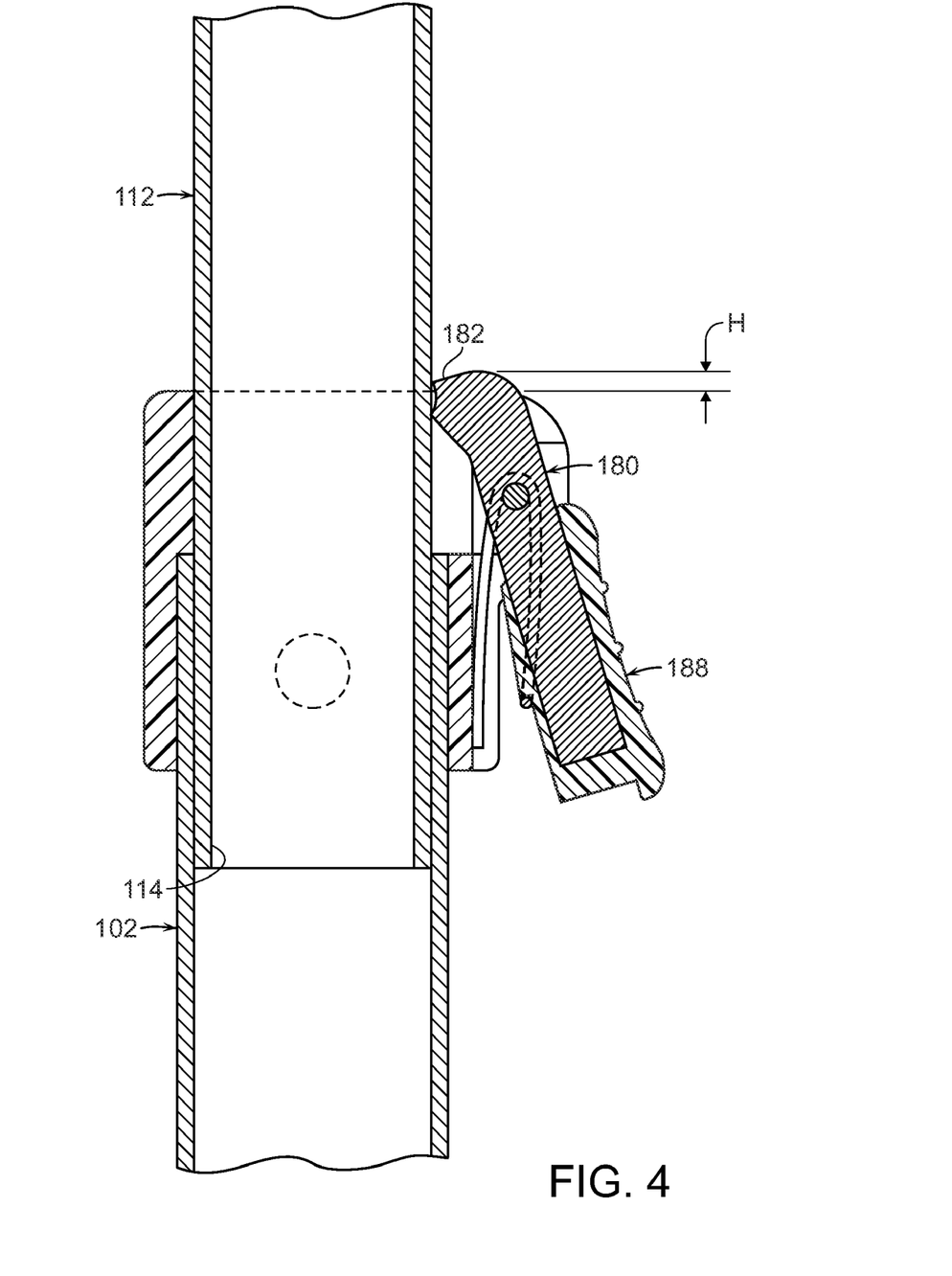
FIG. 4 is a cross-section of the adjustable pole in a locked position with the locking unit engaged with an upper pole.
Figure 5:
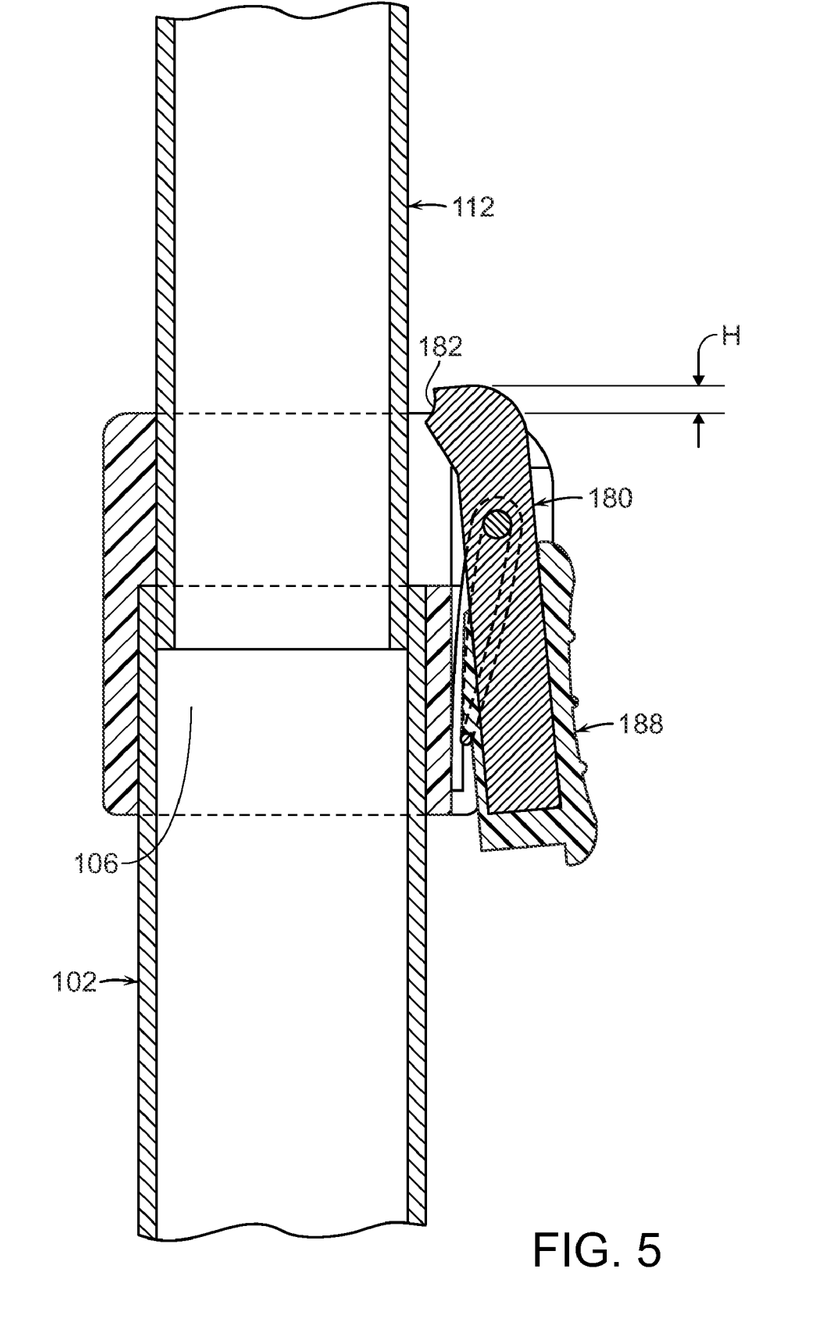
FIG. 5 is a cross-section view of the adjustable pole in an unlocked position with the locking unit disengaged from the upper pole.

Referring to FIGS. 2 and 3, an adjustable pole assembly 100 according to the present invention generally comprises a lower pole 102 having an upper end 106, an upper pole 112 having a lower end 114, and a locking unit 118. Upper pole 112 is telescopically engaged within lower pole 102. Locking unit 118 generally comprises a one-piece unitary housing 120, a spring 172, a lever 180 having a tooth catch 182, and a thumb grip 188. As shown by FIG. 4, in a normally biased state, tooth catch 182 secures upper pole 112 at a selected position relative to lower pole 102. As shown by FIG. 5, upon depression of lever 180, tooth catch 182 is completely disengaged from upper pole 112 allowing it to be adjusted upward or downward relative to lower pole 102. Tooth catch 182 extends a short distance H outward of housing 120 and faces upper pole 112 thereby substantially shielding it from a person's finger or clothing during use.

With continued reference to FIGS. 2 and 3, lower pole 102 further comprises protrusions 108 and 110 extending outward from opposite sides of upper end 106. Protrusions 108 and 110 are formed by a conventional crimping or plier tool. As will be described more fully herein, protrusions 108 and 110 provide a male fastener means to secure housing 120 of locking unit 118 to upper end 106 of lower pole 102. Lower and upper poles 102 and 112 are made from conventional metal tubing such as aluminum and cut to the desired length. Lower pole 102 has an outside diameter of 1.000 inches and an inside diameter of 0.920 inches. Upper pole 112 has an outside diameter of 0.875 inches and an inside diameter of 0.798.

Figure 6:
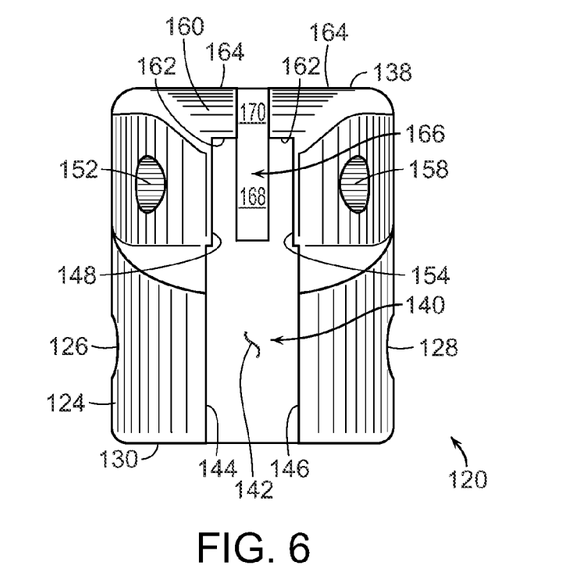
FIG. 6 is a front view of a housing of the locking unit.
Figure 7:
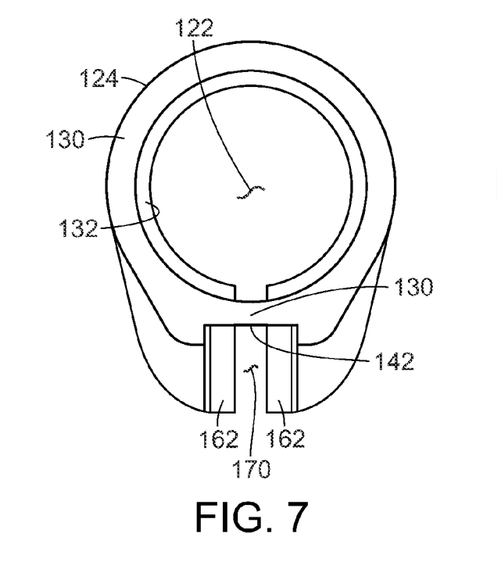
FIG. 7 is a bottom view of the housing.
Figure 8:
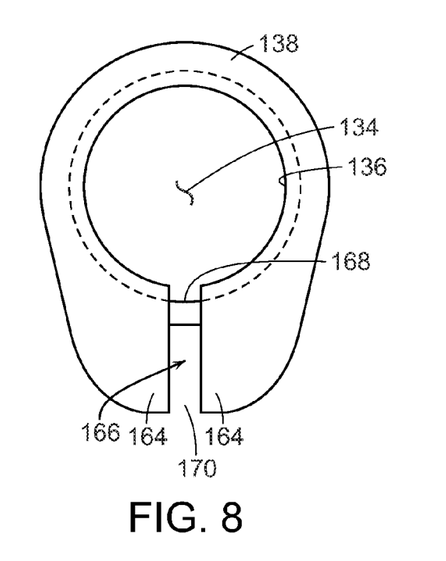
FIG. 8 is a top view of the housing.

Referring to FIGS. 6-8, housing 120 comprises a lower bore 122 having an annular outer wall 124 beginning at a bottom end 130 and terminating at a floor or flange 132. Lower bore 122 further comprises thru-holes 126 and 128 (FIGS. 2 and 3) disposed on opposite sides of annular wall 124. Lower bore 122 has a diameter slightly larger than the outside diameter of lower pole 102. Upper end 106 of lower pole 102 is inserted into lower bore 122 until the top edge of upper end 106 abuts floor or flange 132. Upon complete engagement of lower pole 102 with lower bore 122, thru-holes 126 and 128 engage with protrusions 108 and 110, respectively, of lower pole 120 thereby securing housing 120 on upper end 106. The use of one or more holes or protrusions 108 and 110 on housing 120 allow housing 120 to be quickly dimpled to lower pole 102 by a portable hand held tool. Housing 120 is snapped onto lower pole 102 after dimpling is completed. This gives the advantage of easy on-site replacement of a damaged locking unit 118. Another advantage of this method is with a simple plier type hand tool, a worker can dimple his/her own tooling for the application of locking unit 118.

With continued reference to FIGS. 6-8, housing 120 further comprises an upper bore or guide 134 having an annular inner wall 136 and a top end 138. Upper bore 134 freely guides upper pole 112 into and out of lower pole 102. Upper bore or guide 134 has a diameter slightly larger than the outside diameter of upper pole 112. Lower bore 122 and upper bore 134 share a common central axis. Lower bore 122 has a diameter D1. Upper bore 134 has a diameter D2. The diameter D1 of lower bore 122 is larger than the diameter D2 of upper bore 134 thereby preventing upper end 106 of lower pole 102 from entering upper bore 134.

With continued reference to FIGS. 6-8, housing 120 further comprises a channel 140 extending substantially from bottom end 130 of lower bore 122 to top end 138 of upper bore 134. Channel 140 comprises a floor 142, lower left and right sidewalls 144 and 146, and a top wall 160. Top wall 160 has inside and outside surfaces 162 and 164, respectively. Channel 140 further comprises upper left and right sidewalls 148 and 154 extending upward from floor 142. Left sidewall 148 comprises a thru-hole 152 to receive one end of a pin or rivet 202 (shown in FIG. 3). Right sidewall 154 comprises a thru-hole 158 to receive the opposite end of pin or rivet 202. Channel 140 further comprises a slot 166 having a first portion 168 disposed in floor 142 and a second portion 170 disposed in top wall 160. An upper end of first portion 168 of slot 166 is merged with second portion 170 of slot 166 to provide a continuous L-shaped slot 166 providing access between channel 140 and upper pole 112 disposed in upper bore 134. First portion 168 of slot 166 extends from a point just above lower bore 122 to top wall 160. Housing 120 may be made from conventional materials such as plastic and fabricated by conventional molding processes.

Figures 12, 13:
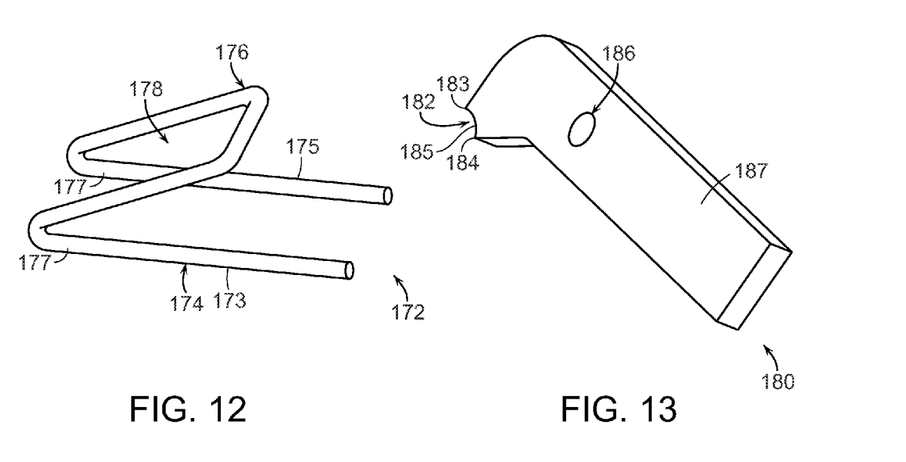
FIG. 12 is a perspective view of a spring according to the present invention.
FIG. 13 is a perspective view of a lever according to the present invention.

Referring to FIG. 12, spring 172 comprises a base portion 174 having spaced elongated members 173 and 175. Spring 172 further comprises an upper portion 176 having an elongated loop portion 178 bent at about forty five degrees to base portion 174. As best shown by FIGS. 3-5, base 174 of spring 172 rests upon or is engaged with floor 142 of housing 120. A forward portion 177 of elongated members 173 and 175 are disposed between sidewalls 148 and 154 and are slighted compressed laterally so that spring 172 will not slide out of floor 142. As will be described more fully herein, elongated loop portion 178 engages with a seat 198 and flange 199 (to be described) of thumb grip 188 to reduce relative movement of thumb grip 188 and spring 172 upon depression of thumb grip 188. Spring 172 is made from a single piece of conventional spring steel and formed by conventional bending and cutting operations.

Referring to FIGS. 3, 6, and 13, lever 180 rotates within channel 140 about pin or rivet 202. Lever 180 comprises tooth catch 182 and handle 87 as previously described. Lever 180 further comprises a centrally located thru-hole 186. Pin or rivet 202 passes thru hole 186 and thru-holes 152 and 158. Tooth catch 182 has forward and rear sharp edges 183 and 184 separated by a valley 185 to grab or penetrate the outside surface of upper pole 112. Forward and rear sharp edges 183 and 184 provide the advantage of additional gripping or holding power while minimizing damage to the pole. Handle 87 has an rectangular cross section that mates or engages within a cavity 200 (to be described) of thumb grip 188. As best shown by FIGS. 4 and 5, tooth catch 182 of lever 180 rotates substantially within slot 166 of channel 140 and faces upper pole 112. Only the uppermost surface of tooth catch 182 extends slightly above top wall 160 which has no sharp edges. The channel and slot design of locking unit 118 provides a significantly safer device than conventional locking devices. In other embodiments, as will be described more fully herein, lever 180 may be mounted lower in channel 140 so that all surfaces of tooth catch 182 are below top wall 160. To provide sufficient gripping force, tooth catch 182 has a hardness greater than the material of upper pole 112. Lever 180 may be made from a conventional metal such as stainless steel and fabricated by conventional machining operations.

Figure 9:
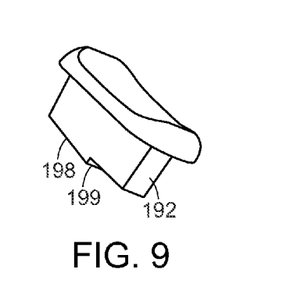
FIG. 9 is a perspective view of a thumb grip according to the present invention.
Figure 10:
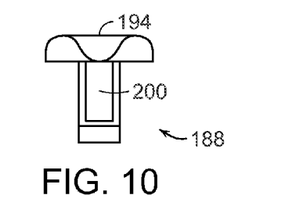
FIG. 10 is a front view of a thumb grip.
Figure 11:
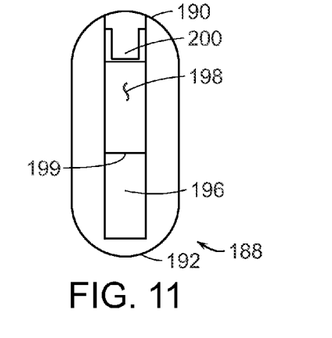
FIG. 11 is a bottom view of the thumb grip.

Referring to FIGS. 9-11, thumb grip 188 comprises a front end 190, a rear end 192, a top 194, and a bottom 196. Thumb grip 188 further comprises a seat 198 that engages with elongated loop portion 178 of spring 172. Thumb grip 188 further comprises a cavity 200 extending inward from front end 190. Cavity 200 is sized to snugly receive handle 187 of lever 180. Secure engagement of seat 198 and elongated loop portion 178 provides the advantage of a more stable locking unit that provides efficient transfer of spring energy to tooth catch 182 and upper pole 112. Further, relative movement between thumb grip 188 and spring 172 is reduced thereby increasing the overall life of each part. Thumb grip 188 may be made from a conventional plastic material and fabricated by conventional molding processes.

Figure 14:
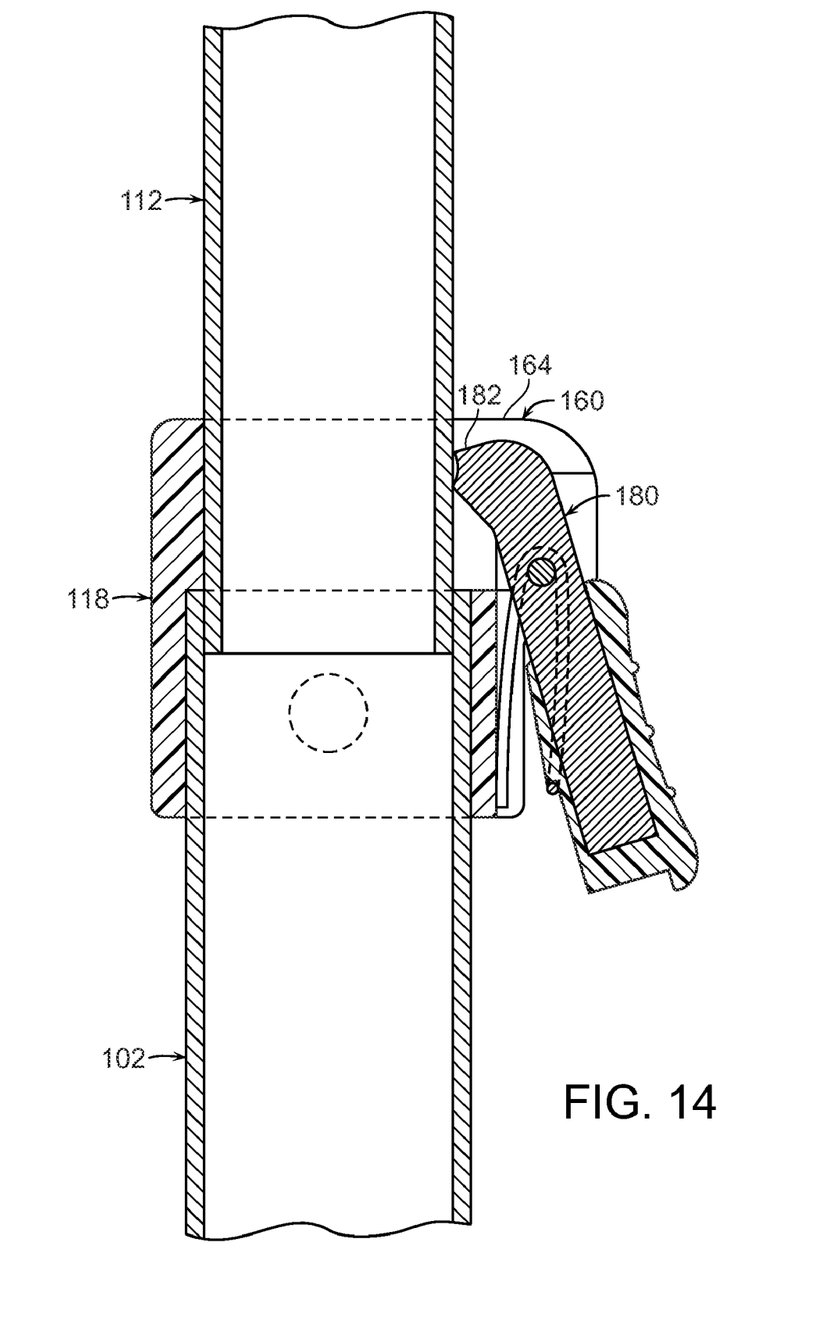
FIG. 14 is a cross-section view of a second embodiment of an adjustable pole according to the present invention with a locking unit shown in a locked position.
Figure 15:
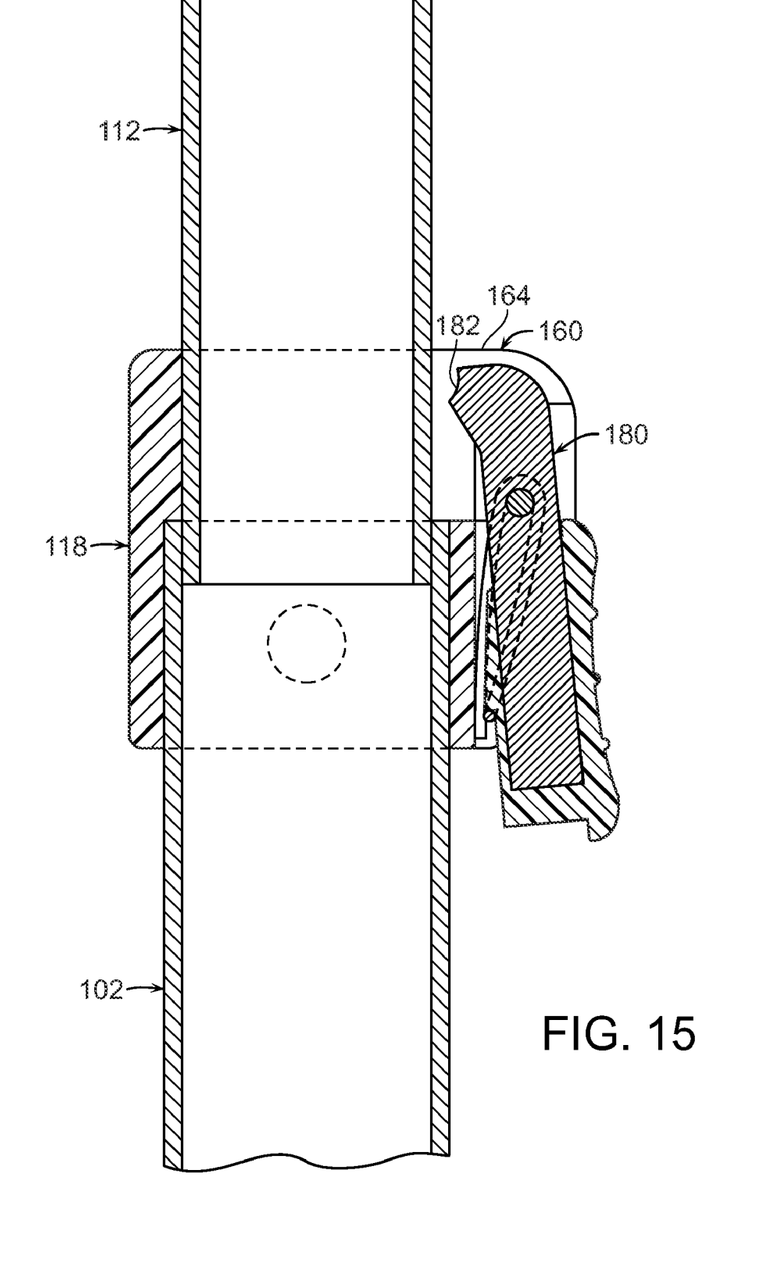
FIG. 15 is a cross-section view of the second embodiment showing the locking unit in an unlocked position.

Referring to FIGS. 14 and 15, where a second embodiment of locking unit 118 is shown. In FIG. 14, locking unit 118 is shown in a normally biased locked state where tooth catch 182 secures upper pole 112 at a selected position relative to lower pole 102. In. FIG. 15, locking unit 118 is shown in an unlocked state where lever 180 has been depressed and tooth catch 182 is completely disengaged from upper pole 112 allowing it to be adjusted upward or downward relative to lower pole 102. Tooth catch 182 is disposed below the top surface 164 of top wall 160 and faces upper pole 112 thereby substantially if not completely shielding it from a person's finger or clothing during use.

Figure 16:
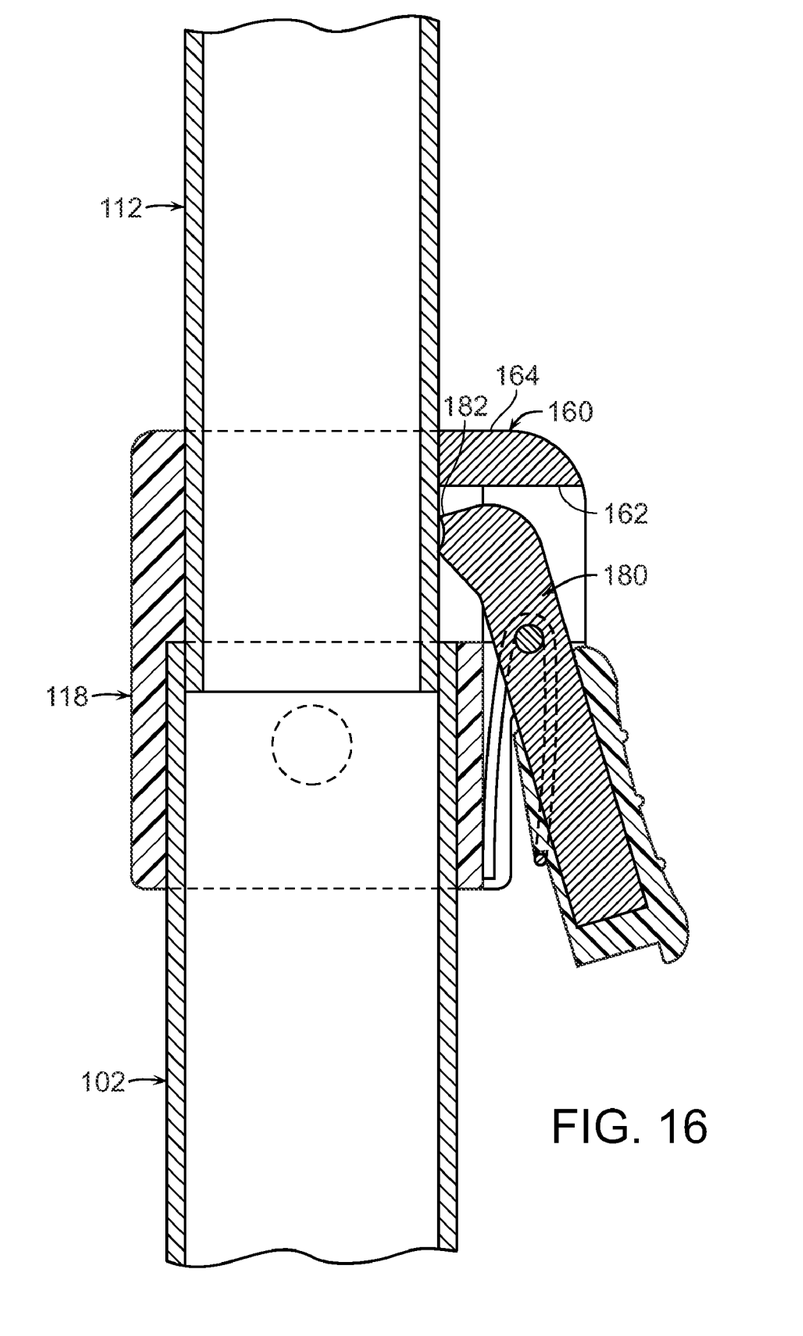
FIG. 16 is a cross-section view of a third embodiment of an adjustable pole according to the present invention with a locking unit shown in a locked position.
Figure 17:
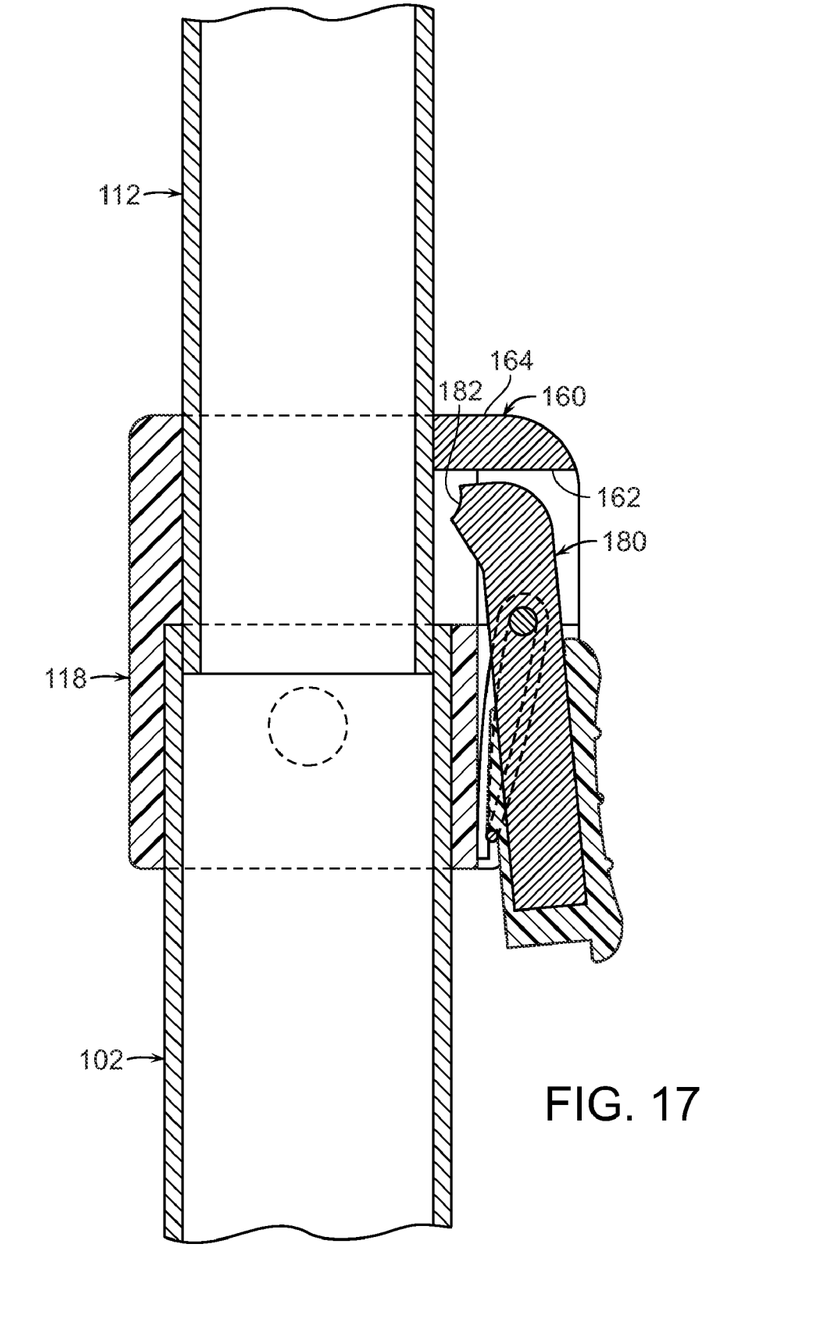
FIG. 17 is a cross-section view of the third embodiment showing the locking unit in an unlocked position.

Referring to FIGS. 16 and 17, where a third embodiment of locking unit 118 is shown. In FIG. 16, locking unit 118 is shown in a normally biased locked state where tooth catch 182 secures upper pole 112 at a selected position relative to lower pole 102. In. FIG. 17, locking unit 118 is shown in an unlocked state where lever 180 has been depressed and tooth catch 182 is completely disengaged from upper pole 112 allowing it to be adjusted upward or downward relative to lower pole 102. Tooth catch 182 is completely disposed below top wall 160 of housing 120 and faces upper pole 112. In this embodiment, second slot portion 170 of slot 166 has been removed from top wall 160. Use of a solid top wall 160 further shields tooth catch 182 from a person's finger or clothing during use.

The foregoing description is intended primarily for purposes of illustration. This invention may be embodied in other forms or carried out in other ways without departing from the spirit or scope of the invention.

What is claimed is:

1. An adjustable pole comprising:
a lower pole comprising an upper end;
an upper pole telescopically engaged with said lower pole;
a locking unit engaged with said upper end of said lower pole; said locking unit comprises:
a one-piece unitary housing comprising a lower bore engaged with said upper end of said lower pole and an upper bore freely guiding said upper pole into and out of said lower pole; said lower and upper bores have a common central axis; said housing further comprises a channel disposed adjacent said upper bore; said channel comprises a floor, left and right sidewalls, and a top wall; said housing further comprises a slot having a first portion disposed in said floor and a second portion disposed in said top wall an upper end of said first portion of slot is merged with said second portion of said slot to provide a continuous L-shaped slot to provide access between said channel and said upper pole disposed within said upper bore; and
a lever rotatably supported within said channel between a locked position where said upper pole cannot be moved and an unlocked position where said upper pole may be moved; said lever comprises a handle portion disposed outward of the channel and a tooth catch engaged with said upper pole in said locked position; said tooth catch is substantially shielded by said top wall and said left and right sidewalls of said channel between said locked and unlocked positions.

2. The adjustable pole of claim 1, further comprising a spring having a base portion engaged with said floor and an upper portion engaged with said lever; said spring is biased to force said tooth catch into contact with said upper pole.

3. The adjustable pole assembly of claim 2, further comprising a pin extending between said left and right sidewalls of said channel; said lever pivots about said pin.

4. The adjustable pole of claim 3, wherein said base portion of said spring has a pair of elongated members engaged with said floor and said upper portion has an elongated loop portion engaged with said handle of said lever.

5. The adjustable pole of claim 4, further comprising a thumb grip engaged with said handle portion of said lever; said thumb grip comprises a seat engaged with said elongated loop portion of said spring.

6. The adjustable pole of claim 5, wherein said thumb grip further comprises a channel engaged with said handle portion of said lever.

7. The adjustable pole of claim 6, wherein said lower bore comprises an annular wall having first and second openings; the upper end of the lower pole has first and second protrusions; said first and second openings of said lower bore are securely engaged with the first and second protrusions of the lower pole, respectively.

8. The adjustable pole of claim 7, wherein said lower bore has a diameter D1; said upper bore has a diameter D2; said diameter D1 of said lower bore is larger than said diameter D2 of said upper bore preventing said upper end of said lower pole from entering said upper bore.

9. The adjustable pole of claim 1, wherein said housing is made from plastic.

10. The adjustable pole of claim 1, wherein said tooth catch of said lever comprises forward and rear edges.

11. A locking unit for use with an upper pole telescopically engaged with a lower pole; the locking unit comprising:
a one-piece unitary housing comprising a lower bore engaged with the upper end of the lower pole and an upper bore freely guiding the upper pole into and out of the lower pole; said lower and upper bores have a common central axis; said housing further comprises a channel disposed adjacent said upper bore; said channel comprises a floor, left and right sidewalls, and a top wall; said housing further comprises a slot having a first portion disposed in said floor and a second portion disposed in said top wall an upper end of said first portion of slot is merged with said second portion of said slot to provide a continuous L-shaped slot to provide access between said channel and the upper pole disposed within said upper bore; and
a lever rotatably supported within said channel between a locked position where said upper pole cannot be moved and an unlocked position where said upper pole may be moved; said lever comprises a handle portion disposed outward of the channel and a tooth catch engaged with said upper pole in said locked position; said tooth catch is substantially shielded by said top wall and said left and right sidewalls of said channel between said locked and unlocked positions.

12. The locking unit of claim 11, further comprising a spring having a base portion engaged with said floor and an upper portion engaged with said lever; said spring is biased to force said tooth catch into contact with the upper pole.

13. The locking unit of claim 12, further comprising a pin extending between said left and right sidewalls of said channel; said lever pivots about said pin.

14. The locking unit of claim 13, wherein said base portion of said spring has a pair of elongated members engaged with said floor and said upper portion has an elongated loop portion engaged with said handle of said lever.

15. The locking unit of claim 14, further comprising a thumb grip engaged with said handle portion of said lever; said thumb grip comprises a seat engaged with said elongated loop portion of said spring.

16. The locking unit of claim 15, wherein said thumb grip further comprises a channel engaged with said handle portion of said lever.

17. The locking unit of claim 16, wherein said lower bore comprises an annular wall having first and second openings adapted to engage with first and second protrusions of the lower pole, respectively.

18. The locking unit of claim 17, wherein said lower bore has a diameter D1; said upper bore has a diameter D2; said diameter D1 of said lower bore is smaller than said diameter D2 of said upper bore preventing said upper end of said lower pole from entering said upper bore.

19. The locking unit of claim 18, wherein said housing is made from plastic.

20. The locking unit of claim 19, wherein said tooth catch of said lever comprises forward and rear edges.

* * * * *